US008769498B2

(12) United States Patent
Burghard et al.

(10) Patent No.: US 8,769,498 B2
(45) Date of Patent: Jul. 1, 2014

(54) WARNING OF REGISTER AND STORAGE AREA ASSIGNMENT ERRORS

(75) Inventors: Stephen J. Burghard, Portsmouth (GB); Brenda Hawkins, Eastleigh (GB); Daniel J. Rivett, Southampton (GB); Andrew Wright, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 13/313,096

(22) Filed: Dec. 7, 2011

(65) Prior Publication Data

US 2013/0152049 A1    Jun. 13, 2013

(51) Int. Cl.
*G06F 9/44* (2006.01)
(52) U.S. Cl.
USPC ......................................... 717/125
(58) Field of Classification Search
CPC ............................ G06F 9/44; G06F 11/07772
USPC ......................................... 717/125
See application file for complete search history.

(56) References Cited

U.S. PATENT DOCUMENTS

| 4,053,752 | A * | 10/1977 | DeJohn et al. ............. 714/710 |
| 5,210,874 | A | 5/1993 | Karger |
| 6,321,379 | B1 | 11/2001 | Callahan, II |
| 7,036,116 | B2 | 4/2006 | Haber et al. |
| 2011/0093686 | A1 | 4/2011 | Penton et al. |
| 2011/0145650 | A1 * | 6/2011 | Krauss ......................... 714/38.1 |
| 2011/0296391 | A1 * | 12/2011 | Gass et al. .................... 717/168 |
| 2012/0221884 | A1 * | 8/2012 | Carter et al. ....................... 714/2 |
| 2013/0152049 | A1 * | 6/2013 | Burghard et al. ............. 717/125 |

FOREIGN PATENT DOCUMENTS

WO    0033188 A2    6/2000

OTHER PUBLICATIONS

Fred C. Chow, "Minimizing Register Usage Penalty at Procedure Calls." Proceedings of the SIGPLAN '88 Conference on Programming Language Design and Implementation, Atlanta, GA, USA, Jun. 22-24, 1988, pp. 85-94, ACM, New York, NY, USA, 1988.

* cited by examiner

*Primary Examiner* — John Chavis
(74) *Attorney, Agent, or Firm* — Jason H. Sosa (57) ABSTRACT

A system for tracking register and/or storage area assignments and warning a programmer of potential assignment errors. More specifically, the system tracks programmer assignments to registers and storage areas and determines if a register or storage area has been modified prior to a call to a program or process external to the source code being examined. The system notes whether a modified register or storage area is restored to its original value subsequent to the external call. If the register or storage area has not been restored, the system displays a warning of a possible assignment error.

20 Claims, 8 Drawing Sheets

| | 304 CURRENT VALUE | 306 PREVIOUS VALUE | 308 "MODIFIED" FLAG | 310 "WARNING" FLAG |
|---|---|---|---|---|
| R5 | value_y | value_x | 1 | 0 |
| R11 | value_z | | 0 | 0 |
| R13 | csa_ptr | eibstg_ptr | 1 | 1 |
| ⋮ | | | | |

WARNING OF REGISTER AND STORAGE AREA ASSIGNMENT ERRORS

FIELD OF THE INVENTION

The present invention relates generally to source code creation and more particularly to error detection in source code during the compilation/build process.

BACKGROUND OF THE INVENTION

In many programming languages, the programmer has the illusion of allocating arbitrarily many variables while a compiler decides how to allocate these variables to specific storage areas (specific memory address or block of memory addresses) or a small, finite set of registers. However, in low-level languages and for some applications it is desirable or necessary for the programmer to specifically allocate and/or assign values to the specific storage areas and registers. Direct assignment to registers and storage areas is often done in assembly language, and in complex programs there are often low-level tasks that either can be better implemented in assembly, or can only be implemented in assembly language. Also, it is frequently useful for the programmer to look at the assembly output of a compiler, and hand-edit, or hand optimize the assembly code in ways that the compiler cannot. Assembly is also useful for time-critical or real-time processes, because unlike with high-level languages, there is no ambiguity about how the code will be compiled. The timing can be strictly controlled, which is also useful for writing simple device drivers.

Separate programs sometimes work together by referencing one another to provide a particular feature or functionality. A first program can make a "call" to a second program. The second (called) program can be another complete program, whose instructions form a logical pattern which further process information passed to it by the first program and, optionally, pass back processed information. Alternatively, the second program can be a series of unrelated statements or macros whose sole purpose is to always process information passed to it, then execute one statement which always passes information back.

When calling an external program, there is a convention that registers and control blocks (a data or storage area with a predefined structure containing the information required for the control of a task, function, or operation) in use by the calling program when the call is made are saved prior to the call and reestablished to their pre-call state or value when control is returned to the calling program. For example, registers may have been used by the calling program for storage of variable values which the calling program used prior to the transfer of control to the called program, and which the calling program may need to use when the called program returns control. The called program may not, however, need to use all of the registers for its processing, and it would be extra, perhaps unnecessary, effort to save the contents of all of these registers in memory if only some of the registers are to be used by the called program. As such, it may suffice to re-allocate only one register (or a limited number) needed by the second program. However, failure to re-allocate the one register back to its original use or value when control is returned to the calling program can lead to subsequent errors in the logic of the calling program. Tracing the source of such an error can be a difficult process as the error may not appear for a time after the control is returned to the calling program.

SUMMARY

Aspects of an embodiment of the present invention disclose a method, computer system, and computer program product for warning of source code assignment errors. The method comprises the subsequent steps. A computer locates a program instruction in source code calling a program or process external to the source code. The computer determines whether a program instruction in the source code modifies a register or storage area and would execute prior to the program instruction calling the program or process. Responsive to the computer determining that there is a program instruction in the source code that modifies the register or storage area and would execute prior to the program instruction calling the program or process, the computer determines whether a program instruction in the source code restores the register or storage area and would execute subsequent to the program instruction calling the program or process. Responsive to the computer determining that there is not a program instruction in the source code that restores the register or storage area and would execute subsequent to the program instruction calling the external program or process, the computer displays a warning message of a potential assignment error.

DETAILED DESCRIPTION

Figure 1:
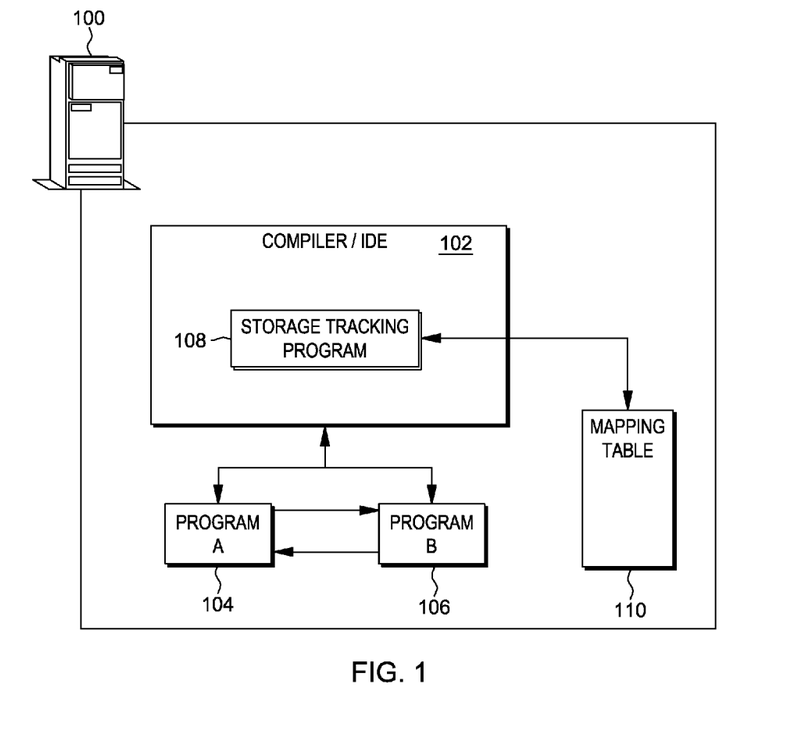
FIG. 1 is a block diagram of a data processing system according to an embodiment of the present invention.

The present invention will now be described in detail with reference to the Figures. FIG. 1 illustrates a data processing system 100 according to one embodiment of the present invention.

Data processing system 100 may, in one embodiment, be a server computer, a client computer, a notebook, a laptop computer, a tablet computer, a handheld device or smartphone, a thin client, or any other electronic device or computing system capable of executing computer program instructions. In another embodiment, data processing system 100 represents a computing system utilizing clustered computers and components to act as a single pool of seamless resources when accessed through a network. This is a common implementation for datacenters and for cloud computing applications.

Data processing system 100 contains compiler/IDE 102 for the writing and editing of source code and converting source code into a computer language (e.g., object code) that a computer, such as data processing system 100, can understand and execute. In this example, data processing system 100 contains source code file 104 containing "program A" and source code file 106 containing "program B," both source code files being accessible and editable via compiler/IDE 102. The instructions of program A in source code file 104 call program B of source code file 106. Storage tracking program 108, depicted as a function of compiler/IDE 102, detects and reports (preferably at compile or IDE usage time) that registers/storage areas, which have been modified in order to make a program or procedure call, may not have been restored to original values after control returns from the call. For example, if a user attempted to compile program A of source code file 104, execution of storage tracking program 108 is initiated, which would scan the instructions of the source code file, locate a call that was made to program B of source code file 106, and determine if any registers or storage areas were modified prior to the call and not restored subsequent to the call. In another embodiment, storage tracking program 108 is a program independent of compiler/IDE 102. In the preferred embodiment, storage tracking program 108 accesses mapping table 110 (a data table, see FIG. 3) to store and look up current and previous values of registers and storage areas used by a source code file that the storage tracking program is currently scanning.

Data processing system 100 includes internal and external components as described in more detail below.

Figure 2:
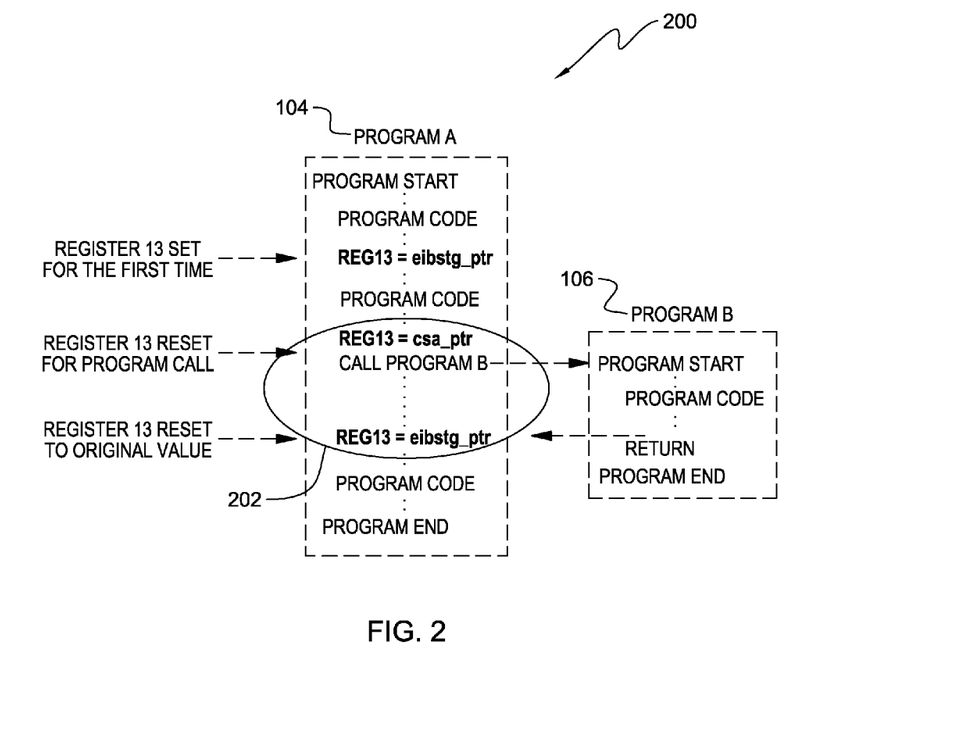
FIG. 2 is an exemplary program flow depicting an allocation error where a first program on the data processing system of FIG. 1 calls a second program on the data processing system and modifies a register or storage area of the data processing system for use in the second program.

FIG. 2 is an exemplary program flow depicting an allocation error where a first program calls a second program and modifies a register or storage area of a data processing system for use in the second program. Program flow 200 shows program A from source code file 104 on data processing system 100 calling program B from source code file 106 on the data processing system.

In program A, the instructions of program A assign register 13 a value unique to program A. Prior to calling program B, the instructions of program A modify register 13, allowing it to be shared by other processes, including program B. A call is made to program B and control passes from program A to program B. Program B now has the capability of using and changing the value in register 13. After program B returns control to program A, program A may use and access any value that program B set in register 13, however, register 13 should still be returned to its original state unique to program A for proper operation of subsequent instructions. Code portion 202 depicts the potential problem area. In code portion 202, register 13 is modified prior to an external call and is correctly restored subsequent to the external call. Storage tracking program 108 detects a failure to restore such a register or storage area.

Figure 3:
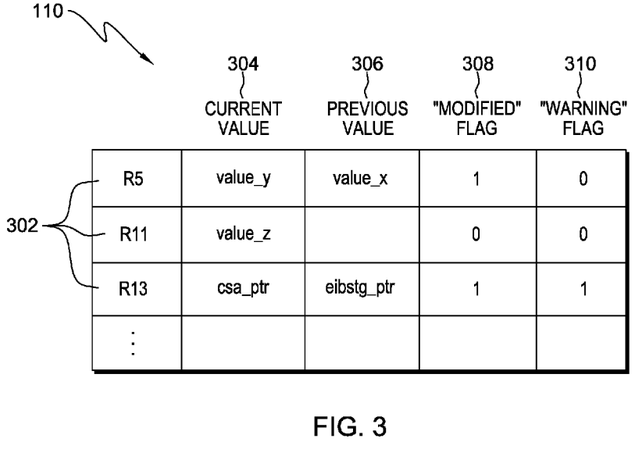
FIG. 3 provides an exemplary depiction of a mapping table on the data processing system of FIG. 1 for tracking values assigned to registers and storage areas.

FIG. 3 provides an exemplary depiction of mapping table 110 on data processing system 100. Mapping table 110 maps the values assigned to registers/storage areas 302 used in the source code being examined by storage tracking program 108. In one embodiment, corresponding to each of the register/storage areas 302, mapping table 110 stores a current value in column 304 and a previous value in column 306. In a preferred embodiment, mapping table 110 also has the capability to store, for each respective register/storage area 302, a "modified" flag in column 308 indicating that the respective register/storage area is not in its original state and a "warning" flag in column 310 indicating that the respective register/storage area is not in its original state and an external call has subsequently taken place.

FIGS. 4, 5, 6, and 7 represent a flowchart of the steps of storage tracking program 108 for detecting and warning of potential errors occurring in source code where registers or storage areas are modified in the source code to be used in a second program but have not been restored to original use subsequent to control being returned from the call, in accordance with an embodiment of the present invention.

Figure 4:
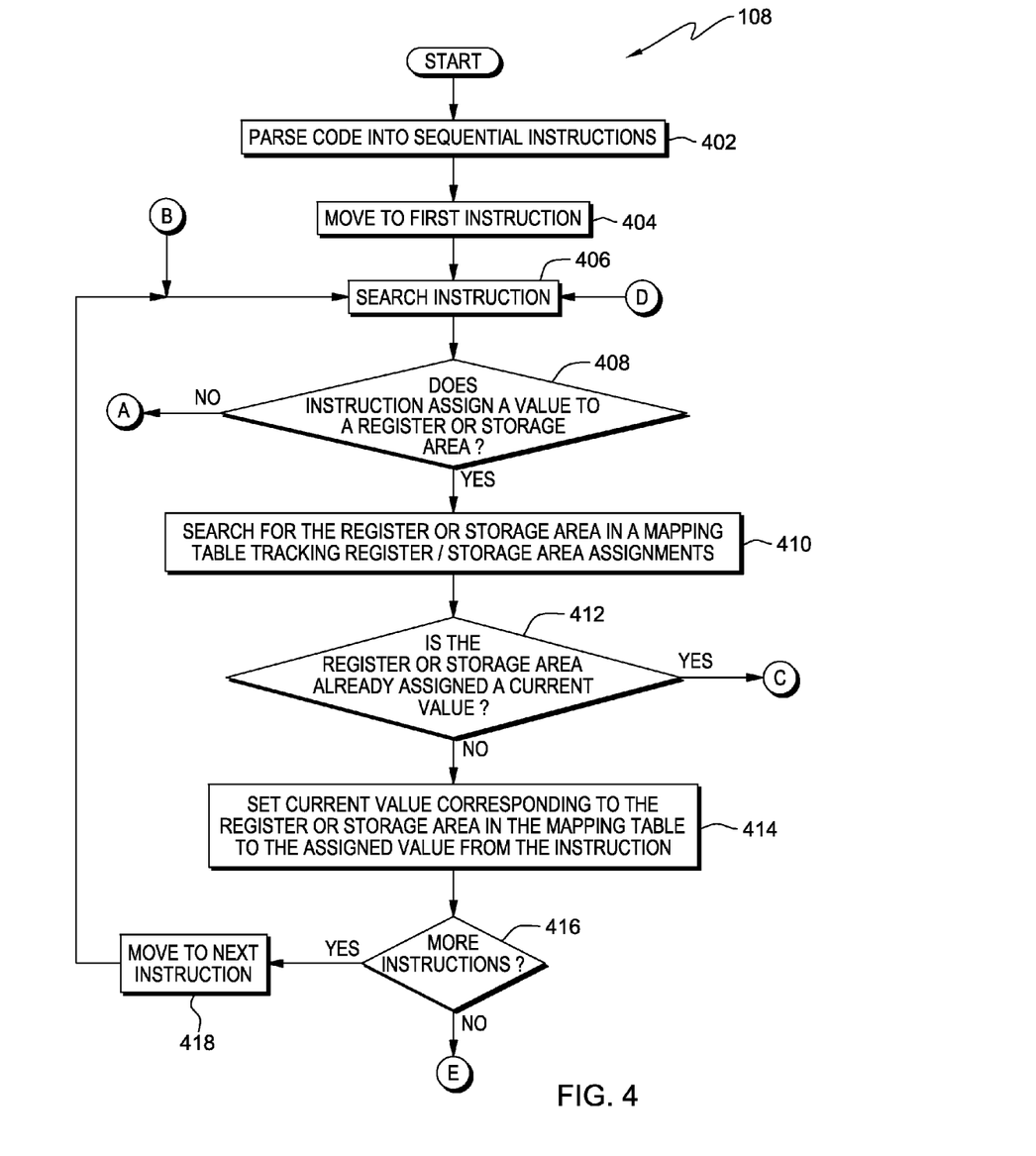
FIGS. 4, 5, 6, and 7 represent a flowchart of the steps of a storage tracking program on the data processing system of FIG. 1 for detecting and warning of potential errors occurring in source code where registers or storage areas are modified in the source code to be used in a second program but have not been restored to original use subsequent to control being returned from a call to the second program, in accordance with an embodiment of the present invention.

Storage tracking program 108 parses source code into sequential instructions (step 402), locates or moves to the first instruction (step 404), and then searches or examines the instruction to determine what the instruction does (step 406). Based on the examination, storage tracking program 108 determines whether the instruction assigns a value to a register or storage area (decision block 408).

If the instruction assigns a value to a register or storage area (yes branch of decision 408), storage tracking program 108 searches for the register or storage area in a mapping table (such as mapping table 110) tracking the register and storage area assignments (step 410). Storage tracking program 108 determines whether the register or storage area is assigned a current value in the mapping table (decision block 412). If the register or storage area is not assigned a current value in the mapping table (no branch of decision 412), storage tracking program 108 sets a current value field corresponding to the register or storage area in the mapping table equal to the assigned value from the instruction (step 414).

Storage tracking program 108 determines whether there are more instructions from the source code (decision block 416). If there are more instructions (yes branch of decision 416), storage tracking program 108 moves to the next sequential instruction (step 418), and returns to step 406 to search the next instruction and run through the process flow for the next instruction.

In an alternate process flow, if in decision block 408 storage tracking program 108 determines that the searched instruction does not assign a value to a register or storage area (no branch of decision 408, depicted in FIG. 5), storage tracking program 108 determines whether the instruction is a call to an external program or process (decision block 502). For example, storage tracking program might look for the key words such as "CALL," "LINK," or an equivalent indicative of passing control from the current program to an external program or process. If storage tracking program 108 determines that the instruction is not an external call (no branch of decision 502), storage tracking program 108 determines whether there are more instructions from the source code (decision block 504). If there are more instructions (yes branch of decision 504), storage tracking program 108 moves to the next sequential instruction (step 506), and returns to step 406 (from FIG. 4) to search the next instruction and run through the process flow for the next instruction.

Figure 5:
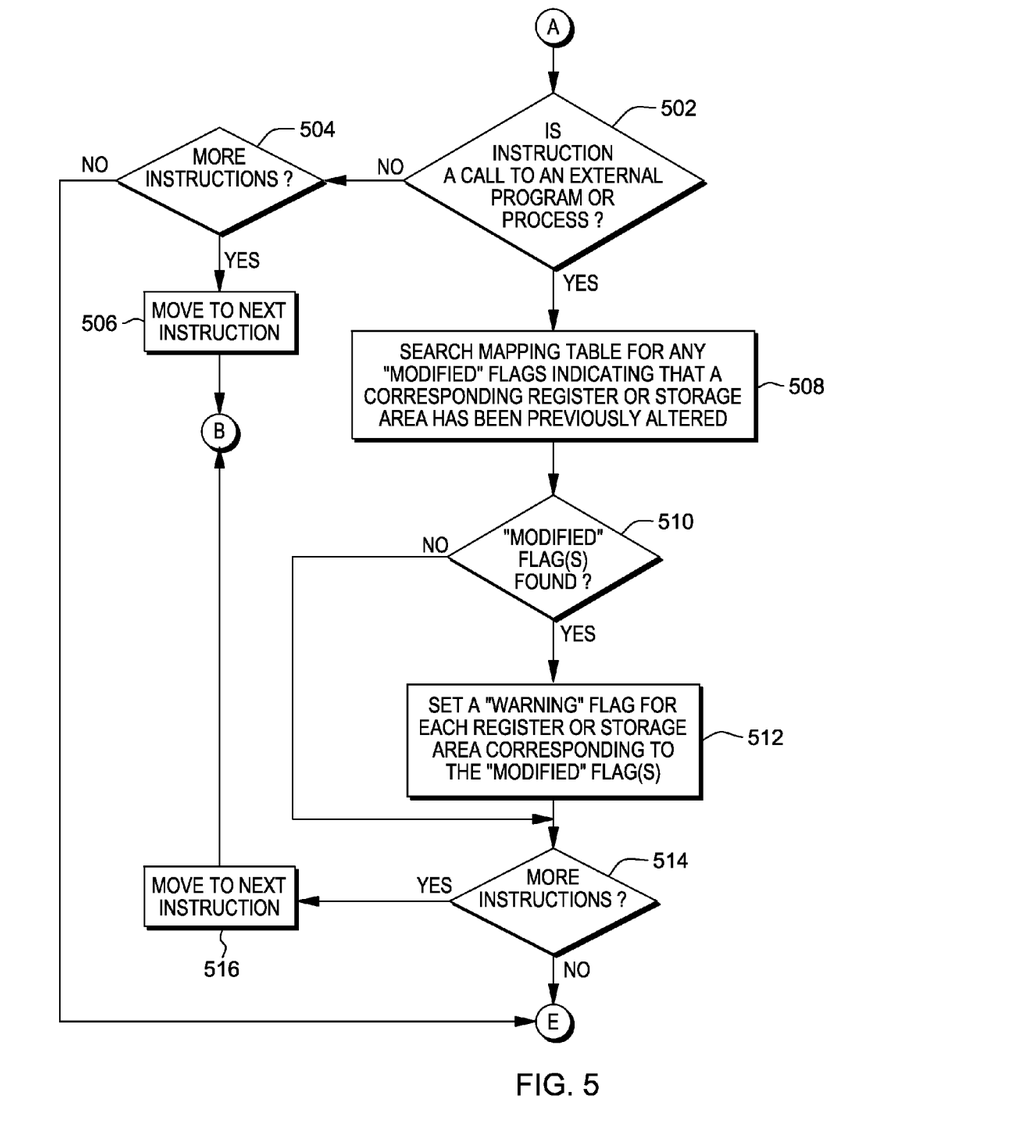

If storage tracking program 108 determines that the searched instruction is an external call (yes branch of decision 502), storage tracking program 108 searches the mapping table for any "modified" flags indicating that a corresponding register or storage area in the mapping table has been previously altered or modified (step 508). In another embodiment, storage tracking program 108 might make the same determination by identifying any registers or storage areas in the mapping table that have both a recorded current and previous value.

Storage tracking program 108 determines whether any "modified" flags were found in the mapping table (decision block 510). If a "modified" flag is found (yes branch of decision 510), this may be indicative of the register or storage area, corresponding to the "modified" flag, being changed for the subsequent external call. Storage tracking program 108 sets a "warning" flag for each register or storage area corresponding to a found "modified" flag (step 512). In an alternate embodiment, the placement of instructions in the sequence may be kept by storage tracking program 108 and only registers or storage areas modified within a certain range of instruction (e.g., within five previous instructions) are flagged with a warning. The "warning" flag indicates that a corresponding register or storage area has been potentially modified for an external call and has not yet been restored to its original value.

Subsequent to setting the "warning" flag(s) (step 512), or alternatively if no "modified" flags were found (no branch of decision 510), storage tracking program 108 determines whether there are more instructions from the source code (decision block 514). If there are more instructions (yes branch of decision 514), storage tracking program 108 moves to the next sequential instruction (step 516), and returns to step 406 (from FIG. 4) to search the next instruction and run through the process flow for the next instruction.

In an alternate process flow, if in decision block 408 (of FIG. 4) storage tracking program 108 determines that the searched instruction assigns a value to a register or storage area (yes branch of decision 408), searches for the register or storage area in the mapping table (step 410), and subsequently determines that the register or storage area has been previously assigned/is already assigned a current value (yes branch of decision 412, depicted in FIG. 6), storage tracking program 108 determines whether the "warning" flag corresponding to the register or storage area is set in the mapping table (decision 602). If the "warning" flag is not set (no branch of decision 602), the register or storage area has not been set prior to an external call. Storage tracking program 108 sets the previous value record corresponding to the register or storage area in the mapping table equal to the current value corresponding to the register or storage area (step 604). Then storage tracking program 108 sets the current value equal to the assigned value of the instruction (step 606) and sets the "modified" flag for the register or storage area (step 608) to indicate that the value of the register or storage area has been altered.

Figure 6:
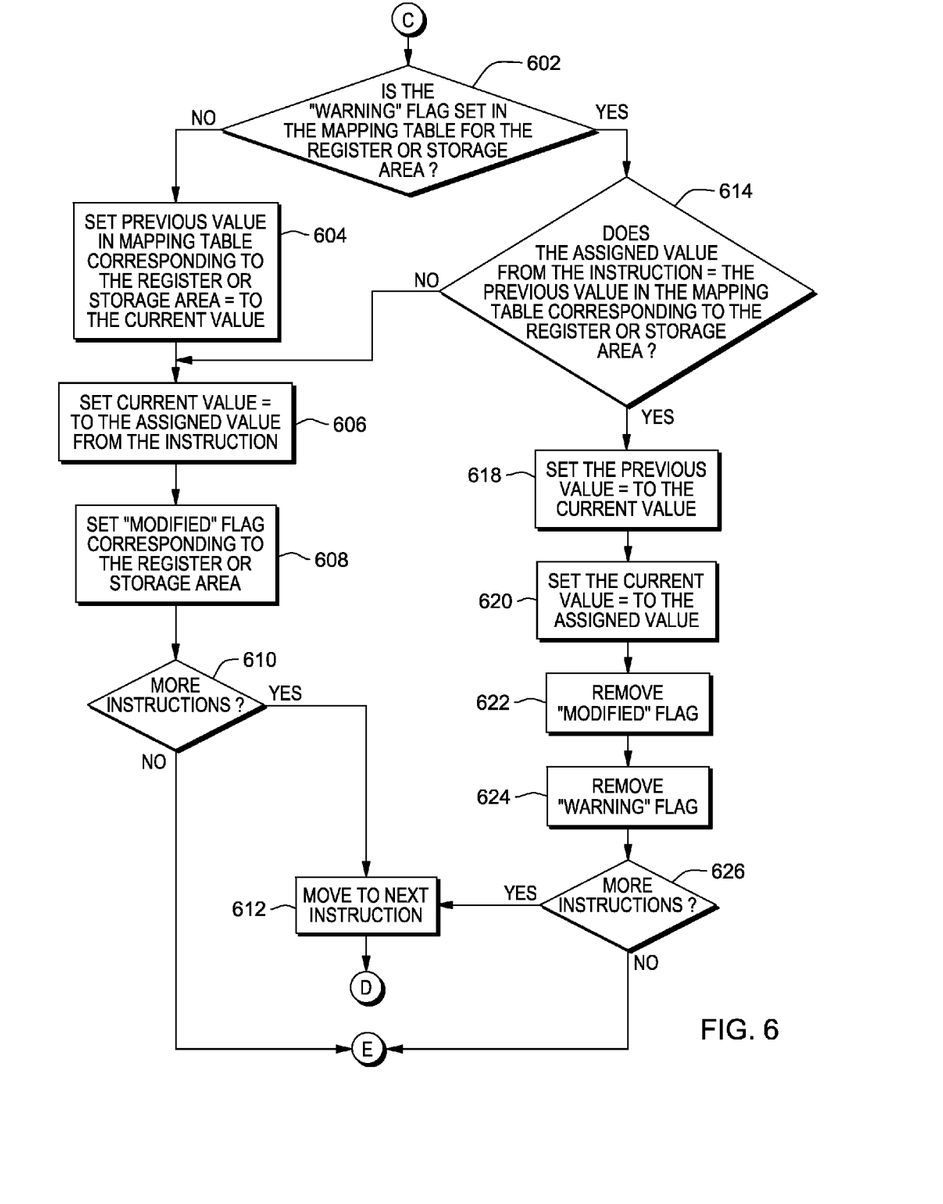

Storage tracking program 108 determines whether there are more instructions from the source code (decision block 610). If there are more instructions (yes branch of decision 610), storage tracking program 108 moves to the next sequential instruction (step 612), and returns to step 406 (from FIG. 4) to search the next instruction and run through the process flow for the next instruction.

If instead, the "warning" flag is set for the register or storage area (yes branch of decision 602), the register or storage area was modified prior to an external call and has not been restored. Storage tracking program 108 determines whether the assigned value from the instruction is the same as the previous value stored for the register or storage area (decision block 614). In other words, storage tracking program 108 determines whether the current instruction is restoring the register or storage area back to its pre-call state, i.e., the previous value.

If the assigned value is not equal to the previous value (no branch of decision 614), then the register or storage area is not being restored, and storage tracking program 108 moves to step 606 to set the current value equal to the assigned value from the instruction and proceed with the process flow. In this embodiment, the previous value is not changed as it represents the state of the register or storage area before the call and storage tracking program 108 may subsequently use the previous value for comparison purposes if a subsequent instruction does restore the original value.

If the assigned value is equal to the previous value (yes branch of decision 614), then it is confirmed that the register or storage area is being restored to the original value. In response, storage tracking program 108 sets the previous value equal to the current value (step 618), sets the current value equal to the assigned value from the instruction (step 620), removes the "modified" flag (step 622), and removes the "warning" flag (step 624).

Storage tracking program 108 determines whether there are more instructions from the source code (decision block 626). If there are more instructions (yes branch of decision 626), storage tracking program 108 moves to the next sequential instruction (step 612), and returns to step 406 (from FIG. 4) to search the next instruction and run through the process flow for the next instruction.

Figure 7:
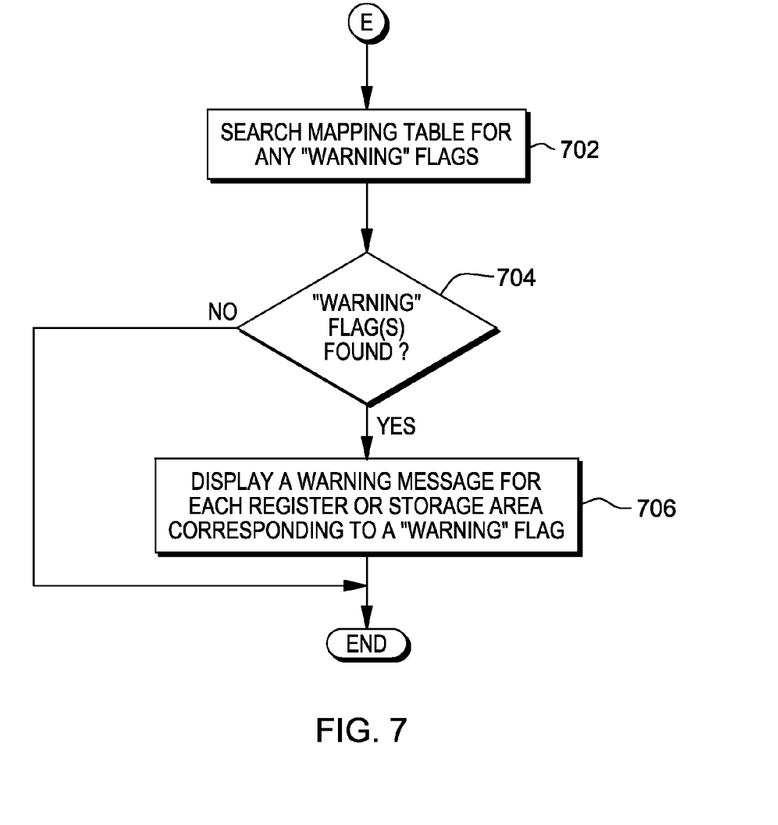

If, during the operation of storage tracking program 108, storage tracking program determines that there are no more instructions (no branch of decisions 416, 504, 514, 610, and 626—depicted in FIG. 7), storage tracking program 108 searches the mapping table for any "warning" flags (step 702). Any "warning" flags left after all instructions are examined indicate a register or storage area that was changed prior to an external call but not restored subsequent to the external call. Storage tracking program 108 determines whether any "warning" flags were found (decision block 704). In response to finding "warning" flags (yes branch of decision 704), storage tracking program 108 displays a warning message for each register or storage area corresponding to a found "warning" flag (step 706). Subsequent to displaying the warning message, or alternatively if storage tracking program 108 determines that no "warning" flags were found (no branch of decision 704), storage tracking program 108 ends.

Figure 8:
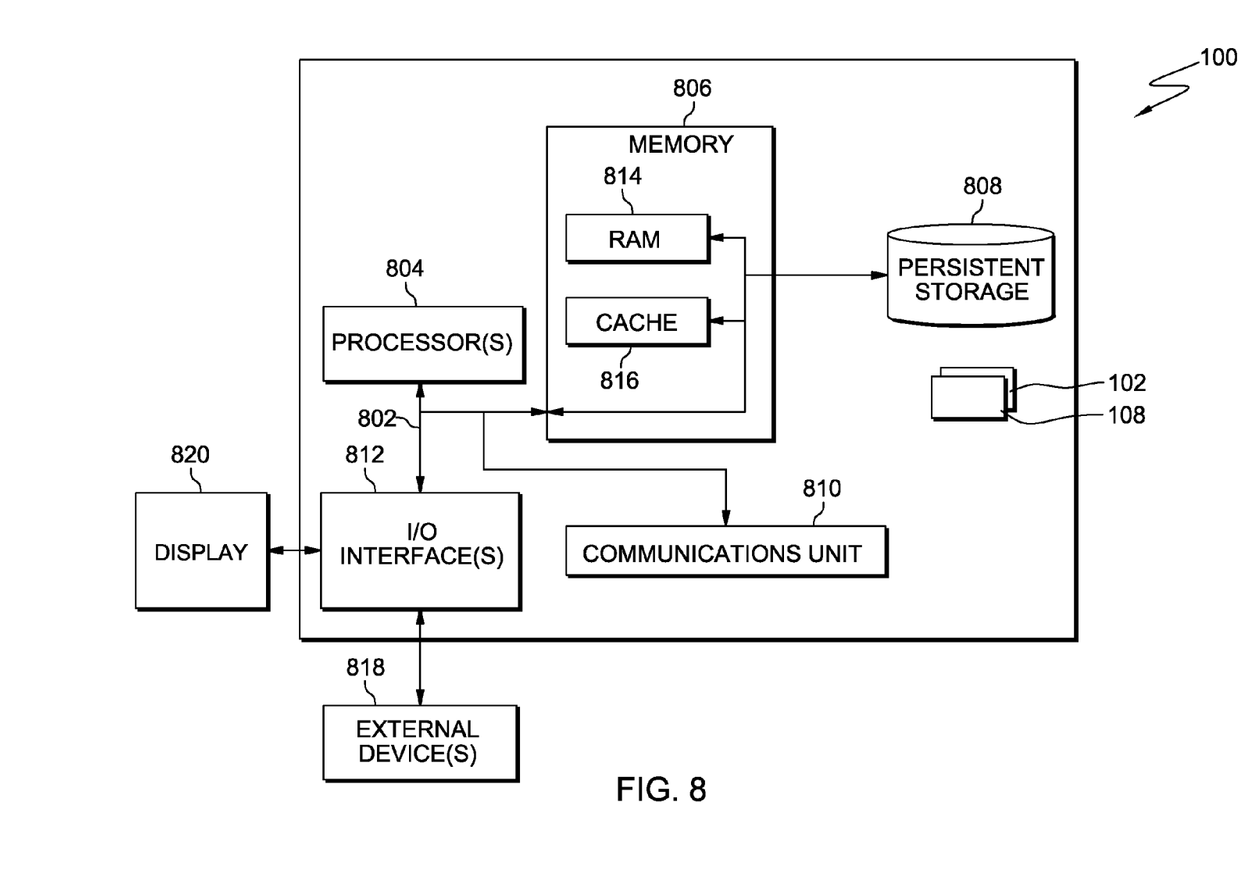
FIG. 8 depicts a block diagram of internal and external components of the data processing system of FIG. 1.

FIG. 8 depicts a block diagram of components of data processing system 100 in accordance with an illustrative embodiment. It should be appreciated that FIG. 8 provides only an illustration of one implementation and does not imply any limitations with regard to the environment in which different embodiments may be implemented. Many modifications to the depicted environment may be made.

Data processing system 100 includes communications fabric 802, which provides communications between processor(s) 804, memory 806, persistent storage 808, communications unit 810, and input/output (I/O) interface(s) 812.

Memory 806 and persistent storage 808 are examples of computer-readable tangible storage devices. A storage device is any piece of hardware that is capable of storing information, such as, data, program code in functional form, and/or other suitable information on a temporary basis and/or permanent basis. Memory 806 may be, for example, one or more random access memories (RAM) 814, cache memory 816, or any other suitable volatile or non-volatile storage device.

Compiler/IDE 102 and storage tracking program 108 are stored in persistent storage 808 for execution by one or more of the respective processors 804 via one or more memories of memory 806. In the embodiment illustrated in FIG. 8, persistent storage 808 includes flash memory. Alternatively, or in addition to, persistent storage 808 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 808 may also be removable. For example, a removable hard drive may be used for persistent storage 808. Other examples include an optical or magnetic disk that is inserted into a drive for transfer onto another storage device that is also a part of persistent storage 808, or other removable storage devices such as a thumb drive or smart card.

Communications unit 810, in these examples, provides for communications with other data processing systems or devices. In these examples, communications unit 810 includes one or more network interface cards. Communications unit 810 may provide communications through the use of either or both physical and wireless communications links. In another embodiment still, data processing system 100 may be devoid of communications unit 810. Compiler/IDE 102 and storage tracking program 108 may be downloaded to persistent storage 808 through communications unit 810.

I/O interface(s) 812 allows for input and output of data with other devices that may be connected to data processing system 100. For example, I/O interface 812 may provide a connection to external devices 818 such as a keyboard, keypad, a touch screen, and/or some other suitable input device. I/O interface(s) may also connect to a display 820.

Display 820 provides a mechanism to display data to a user and may be, for example, a computer monitor.

The aforementioned programs can be written in various programming languages (such as Java or C++) including low-level, high-level, object-oriented or non object-oriented languages. Alternatively, the functions of the aforementioned programs can be implemented in whole or in part by computer circuits and other hardware (not shown).

Based on the foregoing, a method, computer system, and computer program product have been disclosed for detecting and warning of potential memory assignment errors. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in each block may occur out of the order noted in the figures. Therefore, the present invention has been disclosed by way of example and not limitation.

What is claimed is:

1. A method for warning of source code assignment errors, the method comprising the steps of:
    a computer locating a program instruction in source code calling a program or process external to the source code;
    the computer determining whether a program instruction in the source code modifies a register or storage area and comes prior to the program instruction calling the program or process in an execution sequence;
    responsive to the computer determining that there is a program instruction in the source code that modifies the register or storage area and is prior to the program instruction calling the program or process in the execution sequence, the computer determining whether a program instruction in the source code restores the register or storage area and comes subsequent to the program instruction calling the program or process in the execution sequence; and
    responsive to the computer determining that there is not a program instruction in the source code that restores the register or storage area and comes subsequent to the program instruction calling the external program or process in the execution sequence, the computer displaying a warning message of a potential assignment error.

2. The method of claim 1, further comprising the step of the computer parsing the source code into a list of sequentially executing program instructions.

3. The method of claim 2, further comprising the step of the computer generating a data table to track the assignment of values to the register or storage area as the computer examines each of the sequentially executing program instructions.

4. The method of claim 2, wherein the computer determining that there is a program instruction in the source code that modifies the register or storage area and comes prior to the program instruction calling the program or process in the execution sequence, comprises the steps of:
    the computer locating a program instruction in the list of sequentially executing program instructions, that sets the register or storage area;
    the computer locating a program instruction in the list of sequentially executing program instructions, subsequent to the program instruction that sets the register or storage area, that modifies the register or storage area; and
    the computer locating the program instruction calling the program or process in the list of sequentially executing program instructions, subsequent to the program instruction that modifies the register or storage area.

5. The method of claim 3, wherein the computer determining that there is a program instruction in the source code that modifies the register or storage area and comes prior to the program instruction calling the program or process in the execution sequence, comprises the steps of:
    while sequentially examining the sequentially executing program instructions:
    the computer locating a program instruction that assigns a first value to the register or storage area;
    the computer storing the first value in the data table;
    the computer subsequently locating a program instruction that assigns a second value to the register or storage area;
    the computer storing the second value in the data table; and
    the computer subsequently locating the program instruction calling the program or process and in response, the computer determining that the register or storage area was modified prior to the program instruction calling the program or process based on an examination of the data table.

6. The method of claim 2, wherein the computer determining that there is not a program instruction in the source code that restores the register or storage area and comes subsequent to the program instruction calling the program or process in the execution sequence, comprises the steps of:
    responsive to the computer determining that there is a program instruction that modifies the register or storage area and comes prior to the program instruction calling the program or process in the execution sequence, the computer setting a warning indication corresponding to the register or storage area, wherein the computer is programmed to remove the warning indication in response to locating a program instruction restoring the register or storage area;
    the computer examining each program instruction in the list of sequentially executing program instructions, subsequent to the program instruction calling the program or process, to determine whether the examined program instruction restores the register or storage area; and
    subsequent to an examination of the sequentially executing program instructions, the computer determining that the warning indication corresponding to the register or storage area is set.

7. A computer program product for warning of source code assignment errors, the computer program product comprising:
    one or more computer-readable tangible storage devices and program instructions stored on at least one of the one or more storage devices, the program instructions comprising:
    program instructions to locate a program instruction in source code calling a program or process external to the source code;

program instructions to determine whether a program instruction in the source code modifies a register or storage area and comes prior to the program instruction calling the program or process in an execution sequence;

program instructions to, responsive to determining that there is a program instruction in the source code that modifies the register or storage area and comes prior to the program instruction calling the program or process in the execution sequence, determine whether a program instruction in the source code restores the register or storage area and comes subsequent to the program instruction calling the program or process in the execution sequence; and program instructions to, responsive to determining that there is not a program instruction in the source code that restores the register or storage area and comes subsequent to the program instruction calling the external program or process in the execution sequence, display a warning message of a potential assignment error.

8. The computer program product of claim 7, further comprising program instructions, stored on at least one of the one or more storage devices, to parse the source code into a list of sequentially executing program instructions.

9. The computer program product of claim 8, further comprising program instructions, stored on at least one of the one or more storage devices, to generate a data table to track the assignment of values to the register or storage area as each of the sequentially executing program instructions is examined.

10. The computer program product of claim 8, wherein the program instructions to determine that there is a program instruction in the source code that modifies the register or storage area and comes prior to the program instruction calling the program or process in the execution sequence, comprises program instructions to:

locate a program instruction in the list of sequentially executing program instructions that sets the register or storage area;

locate a program instruction in the list of sequentially executing program instructions, subsequent to the program instruction that sets the register or storage area, that modifies the register or storage area; and locate the program instruction calling the program or process, in the sequentially executing program instructions, subsequent to the program instruction that modifies the register or storage area.

11. The computer program product of claim 9, wherein the program instructions to determine that there is a program instruction in the source code that modifies the register or storage area and comes prior to the program instruction calling the program or process in the execution sequence, comprises program instructions to:

while sequentially examining the sequentially executing program instructions:

locate a program instruction that assigns a first value to the register or storage area;

store the first value in the data table;

locate a program instruction that assigns a second value to the register or storage area;

store the second value in the data table;

locate the program instruction calling the program or process; and in response to locating the program instruction calling the program or process, determine that the register or storage area was modified prior to the program instruction calling the program or process based on an examination of the data table.

12. The computer program product of claim 8, wherein the program instructions to determine that there is not a program instruction in the source code that restores the register or storage area and comes subsequent to the program instruction calling the program or process in the execution sequence, comprise:

program instructions to, responsive to determining that there is a program instruction that modifies the register or storage area and comes prior to the program instruction calling the program or process in the execution sequence, set a warning indication corresponding to the register or storage area; and program instructions to determine that the warning indication corresponding to the register or storage area is set, subsequent to an examination of the sequentially executing program instructions.

13. The computer program product of claim 12, further comprising program instructions, stored on at least one of the one or more storage devices, to:

examine each program instruction in the list of sequentially executing program instructions, subsequent to the program instruction calling the program or process, to determine whether the examined program instruction restores the register or storage area; and remove the warning indication in response to locating a program instruction restoring the register or storage area.

14. A computer system for warning of source code assignment errors, the computer system comprising:

one or more processors, one or more computer-readable memories, one or more computer-readable tangible storage devices and program instructions which are stored on the one or more storage devices for execution by the one or more processors via the one or more memories, the program instructions comprising:

program instructions to locate a program instruction in source code calling a program or process external to the source code;

program instructions to determine whether a program instruction in the source code modifies a register or storage area and comes prior to the program instruction calling the program or process in an execution sequence;

program instructions to, responsive to determining that there is a program instruction in the source code that modifies the register or storage area and comes prior to the program instruction calling the program or process in the execution sequence, determine whether a program instruction in the source code restores the register or storage area and comes subsequent to the program instruction calling the program or process in the execution sequence; and program instructions to, responsive to determining that there is not a program instruction in the source code that restores the register or storage area and comes subsequent to the program instruction calling the external program or process in the execution sequence, display a warning message of a potential assignment error.

15. The computer system of claim 14, further comprising program instructions, stored on at least one of the one or more storage devices for execution by at least one of the one or more processors via at least one of the one or more memories, to parse the source code into a list of sequentially executing program instructions.

16. The computer system of claim 15, further comprising program instructions, stored on at least one of the one or more storage devices for execution by at least one of the one or more processors via at least one of the one or more memories, to generate a data table to track the assignment of values to the register or storage area as each of the sequentially executing program instructions is examined.

17. The computer system of claim 15, wherein the program instructions to determine that there is a program instruction in the source code that modifies the register or storage area and comes prior to the program instruction calling the program or process in the execution sequence comprises program instructions to:
  locate a program instruction in the list of sequentially executing program instructions that sets the register or storage area;
  locate a program instruction in the list of sequentially executing program instructions, subsequent to the program instruction that sets the register or storage area, that modifies the register or storage area; and
  locate the program instruction calling the program or process, in the list of sequentially executing program instructions, subsequent to the program instruction that modifies the register or storage area.

18. The computer system of claim 16, wherein the program instructions to determine that there is a program instruction in the source code that modifies the register or storage area and comes prior to the program instruction calling the program or process in the execution sequence, comprises program instructions to:
  while sequentially examining the sequentially executing program instructions:
  locate a program instruction that assigns a first value to the register or storage area;
  store the first value in the data table;
  locate a program instruction that assigns a second value to the register or storage area;
  store the second value in the data table;
  locate the program instruction calling the program or process; and
  in response to locating the program instruction calling the program or process, determine that the register or storage area was modified prior to the program instruction calling the program or process based on an examination of the data table.

19. The computer system of claim 15, wherein the program instructions to determine that there is not a program instruction in the source code that restores the register or storage area and comes subsequent to the program instruction calling the program or process in the execution sequence, comprise:
  program instructions to, responsive to determining that there is a program instruction that modifies the register or storage area and comes prior to the program instruction calling the program or process in the execution sequence, set a warning indication corresponding to the register or storage area; and
  program instructions to determine that the warning indication corresponding to the register or storage area is set, subsequent to an examination of the sequentially executing program instructions.

20. The computer system of claim 19, further comprising program instructions, stored on at least one of the one or more storage devices for execution by at least one of the one or more processors via at least one of the one or more memories, to:
  examine each program instruction in the list of sequentially executing program instructions, subsequent to the program instruction calling the program or process, to determine whether the examined program instruction restores the register or storage area; and
  remove the warning indication in response to locating a program instruction restoring the register or storage area.

* * * * *